United States Patent [19]

Aarts

[11] Patent Number: 4,845,977
[45] Date of Patent: Jul. 11, 1989

[54] METHOD AND AN APPARATUS FOR DETECTING A POSSIBLE LEAK IN A VACUUM PACKAGE

[75] Inventor: Mathias L. C. Aarts, Bilthoven, Netherlands

[73] Assignee: Product Suppliers AG, Zug, Switzerland

[21] Appl. No.: 206,760

[22] Filed: Jun. 15, 1988

[30] Foreign Application Priority Data

Jun. 16, 1987 [NL] Netherlands .................. 8701397

[51] Int. Cl.$^4$ .............................................. G01M 3/32
[52] U.S. Cl. ................................................... 73/49.3
[58] Field of Search ...................... 73/49.3, 45.4, 52

[56] References Cited

U.S. PATENT DOCUMENTS

| 3,352,146 | 11/1967 | Lyssy | 73/38 |
| 3,792,607 | 2/1974 | Fukuda | 73/49.3 |

FOREIGN PATENT DOCUMENTS

| 0152981 | 8/1985 | European Pat. Off. . | |
| 1271423 | 6/1968 | Fed. Rep. of Germany | 73/49.3 |
| 38338 | 2/1987 | Japan | 73/49.3 |
| 38339 | 2/1987 | Japan | 73/49.3 |
| 395584 | 12/1965 | Switzerland . | |
| 1386239 | 3/1975 | United Kingdom . | |

OTHER PUBLICATIONS

Patent Abstracts of Japan, vol. 9, No. 54, 3/1985 & JP,A, 59/190632, 10/1984.
Patent Abstracts of Japan, vol. 3, No. 106, 9/1979 & JP,A, 54/83496, 7/1979.
Patent Abstracts of Japan, vol. 3, No. 44, 4/1979 & JP,A, 54/22888, 2/1979.

*Primary Examiner*—Stewart J. Levy
*Assistant Examiner*—Joseph W. Roskos
*Attorney, Agent, or Firm*—Cushman, Darby & Cushman

[57] ABSTRACT

A method of detecting a possible leak in a vacuum package, including placing the package in a gauging space, shutting off the gauging space, applying a pressure in the closed gauging space higher than that in the vacuum package, and gauging the pressure in the gauging space as function of the time for a predetermined gauging period. At least two identical vacuum packages are each placed in a separate gauging space of identical size. A mutually identical initial pressure is applied in the closed gauging spaces and the pressure variation is simultaneously gauged in the closed gauging spaces, while the difference in pressure variation between the two gauging spaces is determined. An apparatus is used which includes at least two gauging spaces of identical size, each for receiving an identical vacuum package. These gauging spaces are connectable to a common space. The gauging space can be shut off from the common space. The pressure can be simultaneously gauged as a function of the time in each gauging space. A device is provided for determining the difference in pressure variation between the two or each pair of gauging spaces. The gauging spaces can be bounded by stationary walls or by a sheet-like, flexible and gas-tight body.

8 Claims, 6 Drawing Sheets

METHOD AND AN APPARATUS FOR DETECTING A POSSIBLE LEAK IN A VACUUM PACKAGE

BACKGROUND OF THE INVENTION

This invention relates to a method of detecting a possible leak in a vacuum package, which comprises
placing the package in a gauging space,
shutting off the gauging space,
using a pressure in the sealed gauging space that is higher than that within the vacuum package, and
gauging the pressure in the gauging space as a function of the time for a predetermined gauging period.

A method of this kind is known from European Pat. No. 152,981, which describes a method wherein the vacuum package to be tested is placed in a gastight, sheet-like body. After this body has been hermetically sealed, the pressure in the space between the sheet-like body and the package is gauged for some time as a function of the time. The change in pressure can be used as a measure for establishing whether there is a leak in the package.

In certain cases, it had been found that it was not possible with this method to identify leaky packages in a short period with sufficient reliability. In part, this inaccuracy can be attributed to the usually minute size of an occurring leak. When, for instance, a package of coffee with a vacuum pressure of about 40 mbar is leaky, it may sometimes take many days in atmospheric surroundings before the pressure in the package has increased to a value of about 800 mbar, at which pressure the package has softened palpably.

For economic and practical reasons, it is desirable to keep the gauging time short, e.g. not longer than 10 seconds. In this short period of time, the rise in pressure in the leaky package of the example mentioned will, e.g., be as little as about 0.09 mbar. The corresponding pressure drop in a gauging space of about equal magnitude as the free space in the package and at atmospheric initial pressure will then be approximately of the same order of magnitude, e.g. 0.1 mbar. Pressure gauges adapted to detect such a minute change in pressure are commercially available. At a gauging time shorter than 10 seconds, the change in pressure will naturally be smaller still.

Apart from this weak leakage signal in the gauging space, it turns out that there are other causes for changes in pressure in this space, in particular those resulting from temperature changes during the gauging of a package having a temperature differing from the ambient temperature. The influence of these disturbances relatively to the leakage signal may be comparatively substantial. As a result, the changes in pressure per unit of time in the gauging space as a result of even slight temperature changes of the package, e.g. a temperature drop of one-tenth or some tenths of degrees Celsius during the measuring period, may already lead to pressure disturbances that are up to many times higher than a possible leak signal. The disturbances can result both in a pressure drop and a pressure rise in the gauging space, with the eventual magnitude being the resultant of a plurality of separate disturbing influences. Also, the magnitude of the pressure disturbances is not always constant during a longer period on which many hundreds of packages are successively tested for leaks.

In addition to temperature influences, other disturbing factors may occur, e.g. a disturbance factor that may occur in a gauging method according to the above mentioned European Pat. No. 152,981, wherein the gauging space is formed on the exterior by a flexible bag pressed at superatmospheric pressure against the vacuum package placed in the bag. It has been found that the abutment of this bag against the package can slightly change during gauging as a function of the time, thereby also changing the size of the gauging space remaining between package and bag in a disturbing manner.

SUMMARY OF THE INVENTION

It is an object of the present invention to increase the reliability of the above-described known method of establishing possible leaky vacuum packages, by considerably restricting or excluding the influence of disturbing factors on the pressure gauging.

To that effect, the method according to the present invention is characterized by placing at least two identical vacuum packages each in a separate gauging space of equal size, applying a mutually equal initial pressure in the sealed gauging spaces, gauging the pressure variation in the sealed gauging spaces simultaneously, and determining the difference in pressure variation between the two gauging spaces.

The present invention is based on the phenomenon that, at any given moment, the disturbing influences on the gauging results of a plurality of packages to be gauged simultaneously, are usually identical, or substantially identical. This applies, in particular, when, as usual, the packages to be gauged simultaneously are obtained from a series of packages supplied continuously by a production line, and which are in the same condition. Although the disturbing influences may differ in an absolute sense, e.g. in gauging one day or another, the mutual differences between the packages being gauged at the same moment are absent or negligibly small.

Naturally, the packages to be gauged simultaneously should correspond in respect of aspects relevant to this gauging method, such as size and temperature. The gauging time should be sufficiently long to allow detection of a leaky package from the differences in pressure variation between the gauging spaces. The gauging time may be about 10 seconds, but substantially shorter times of e.g. only 5-6 seconds are possible. The initial pressure in the gauging space should be equal in all gauging spaces. The simplest manner to ensure this is to put the open gauging spaces into communication with the atmosphere, and subsequently to close these spaces, after reception of the vacuum packages. If desired, however, other initial pressures, higher or lower than the atmospheric pressure, may be used, as long as these are substantially higher than the vacuum pressure in the package.

The entire gauging method can be performed as an extension of a production process for the manufacture of the vacuum packages. The method is then automated, and the gauging of the pressure and the determination of the differences in pressure between the gauging spaces are effected by electronic control units.

In simultaneously gauging only two packages, there is a theoretical possibility that both packages are leaky to the same extent and that no difference is produced in pressure variation between the gauging spaces, as is the case when there are no leaks at all. In actual practice, this situation occurs hardly, or not at all under normal circumstances. However, this possible drawback can be eliminated by gauging three or even four packages at a time, thereby determining the differences in pressure variation between each pair of gauging spaces, i.e. 3 and 6 determinations, respectively.

The present invention further comprises an apparatus for determining a possible leak in a vacuum package according to the above method, characterized by at least two equally sized gauging spaces, each for receiving an identical vacuum package, said spaces being connectable to a common space, means for sealing each gauging space off the common space, means for simultaneously gauging the pressure as a function of the time in each gauging space, and means for determining the difference in pressure variation between the two or each pair of gauging spaces.

The present invention can be used in gauging spaces having stationary walls in which spaces the packages are placed. The smaller the space, the larger the pressure drop therein in the event of a leaky package. Therefore, preference is given to the combination of the invention with a gauging method as described in the aforementioned European Pat. No. 152,981, wherein the gauging space is bounded by a flexible sheet-like body, which is pressed against the package, thereby forming a very small gauging space between the package and the enveloping sheet, and producing in the event of a leaky vacuum package a relatively large pressure drop during gauging in the gauging space. By virtue of this relatively substantial signal and using the improvement according to the present invention, a gauging time shorter than 10 seconds suffices to identify a leak or a smaller leak can be detected within the same gauging time.

BRIEF DESCRIPTION OF THE DRAWING

The present invention will now be further described, by way of example, with reference to the accompanying diagrammatical drawings, in which.

DETAILED DESCRIPTION

Figure 1:
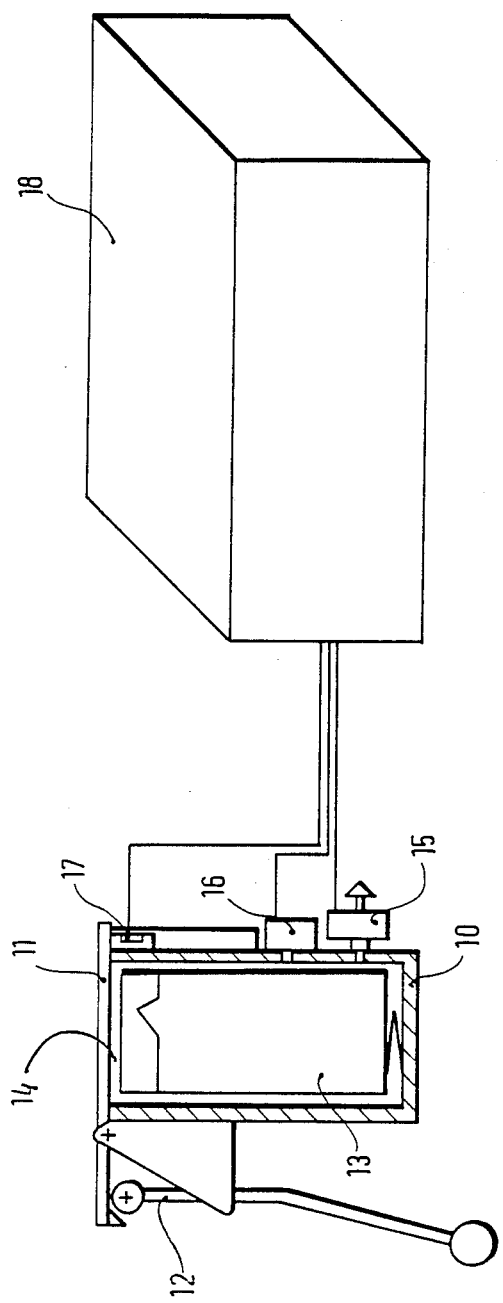
FIG. 1 shows an apparatus for determining a possible leak in vacuum packages.

The apparatuses shown in the drawings use gauging chambers having stationary (i.e. non-flexible) walls.

The apparatus shown in FIG. 1 comprises a plurality of identical gauging chambers 10 (only one being shown), which can be sealed with a lid 11 by means of a sealing mechanism 12. A vacuum package 13 can be placed in gauging chamber 10, after which a gauging space 14 is formed between the package and the sealed gauging chamber. The gauging chamber further includes a vent valve 15, a pressure gauge 16 connected to the gauging space 14, and a microswitch 17 for actuation of the sealing mechanism 12. An electronic control and gauging unit 18 is electrically connected to valve 15 for its operation, to the pressure gauge 16 for recording, analyzing and processing the pressure signal recorded by the gauge, and to the microswitch 17 for its operation. Similarly, the unit 18 is connected to the other gauging chambers 10. For the purpose of leak detection, the packages 13 are placed each separately in one of the opened gauging chambers 10. The vent valve 15 is then opened and the interiors of the gauging chambers are in communication with the atmospheric surroundings. Subsequently, the gauging chambers are shut off with the lids 11. Immediately thereafter, valves 15 are shut off. Valves 15, in open position, serve for prevention any pressure rise in the gauging space when the lids are closed and for facilitating the opening of the gauging chamber after gauging. For a predetermined gauging time, the pressure is continuously gauged simultaneously in all gauging spaces by means of pressure gauges 16 and passed on to gauging unit 18. Gauging unit 18 records the incoming signals and compares the pressure variation of each gauging chamber with that of each of the other gauging chambers, each time determining the difference in pressure variation between each pair of gauging chambers. After lapse of the gauging time, the gauging chambers are opened again by actuation of the microswitch 17, after vent valve 15 has been opened first. After each package has been taken from the gauging chambers, the gauging cycle can be repeated.

Figure 2:
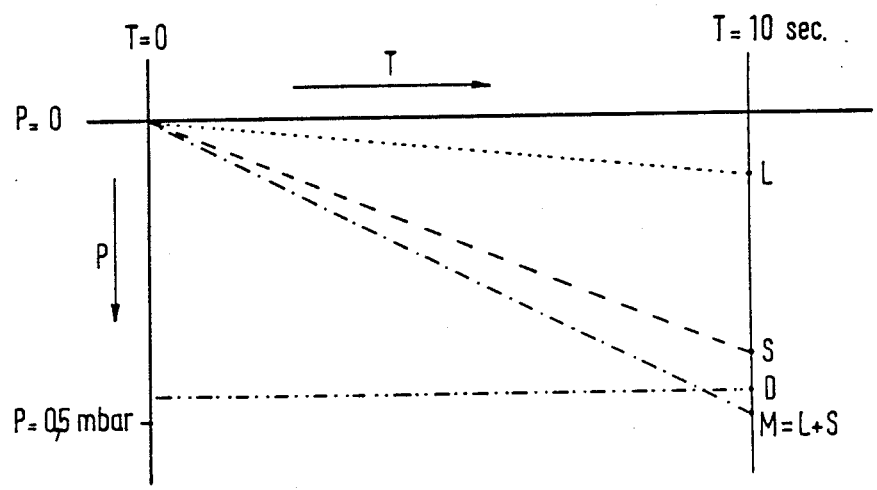
FIG. 2 is a pressure/time diagram of a disturbance signal and of a leak signal in the gauging space of the apparatus.

FIG. 2 shows an analysis of the pressure drop in a gauging space during the leak detection of a vacuum package. On the horizontal axis of the diagram, the time T is represented, while on the vertical axis in the direction of the arrow, the pressure drop P in the gauging space is represented. The pressure variation due to disturbing influences is represented by line S, which, therefore, shows the actual pressure drop in the gauging space during the testing of a non-leaky vacuum package. When the package is leaky, but no pressure drop due to disturbances occurs, the pressure drop could theoretically extend according to line L. In reality, only the total presure drop is measured and the pressure in the gauging space, in the event of a leaky package, follows the line M, being the resultant of pressure lines L and S. The relative difference between a pressure line $M=L+S$ (leaky package) and a pressure line $M=S$ (non-leaky package) is mostly slight. As a result, it is very difficult to determine whether a gauged package is leaky or not. Moreover, during the successive separate tests of packages in a gauging chamber, changes may occur in the magnitude of the disturbance signal S. Also, the magnitude of the leak signal L is usually not identical for all leaky packages. The result is that a comparatively large margin for the detection limit D has to be maintained in order to qualify a package as leaky with sufficient certainty (by establishing a larger pressure drop than the value D). On the other hand, there is the risk that possibly leaky packages are considered inaccurately as non-leaky.

The improvement obtained with the present invention upon simultaneous use of at least two gauging spaces will now be explained with reference to FIG. 3, in a comparison test of two packages in two gauging spaces. The upper diagram shows the pressure variation of a (non-leaky) package in the one gauging space A. Here, the pressure drop is caused exclusively by disturbing influences. The centre diagram shows the simultaneously-gauged pressure variation of a (leaky) package in the other gauging space B. The lower diagram shows the difference in pressure variation between the two gauging spaces, which eliminates the pressure drop from disturbing influences in the upper two diagrams, and shows that the package in gauging space B is leaky. When neither of the two packages is leaky, a pressure line P=O would be followed in the lower diagram during gauging.

Figure 4:
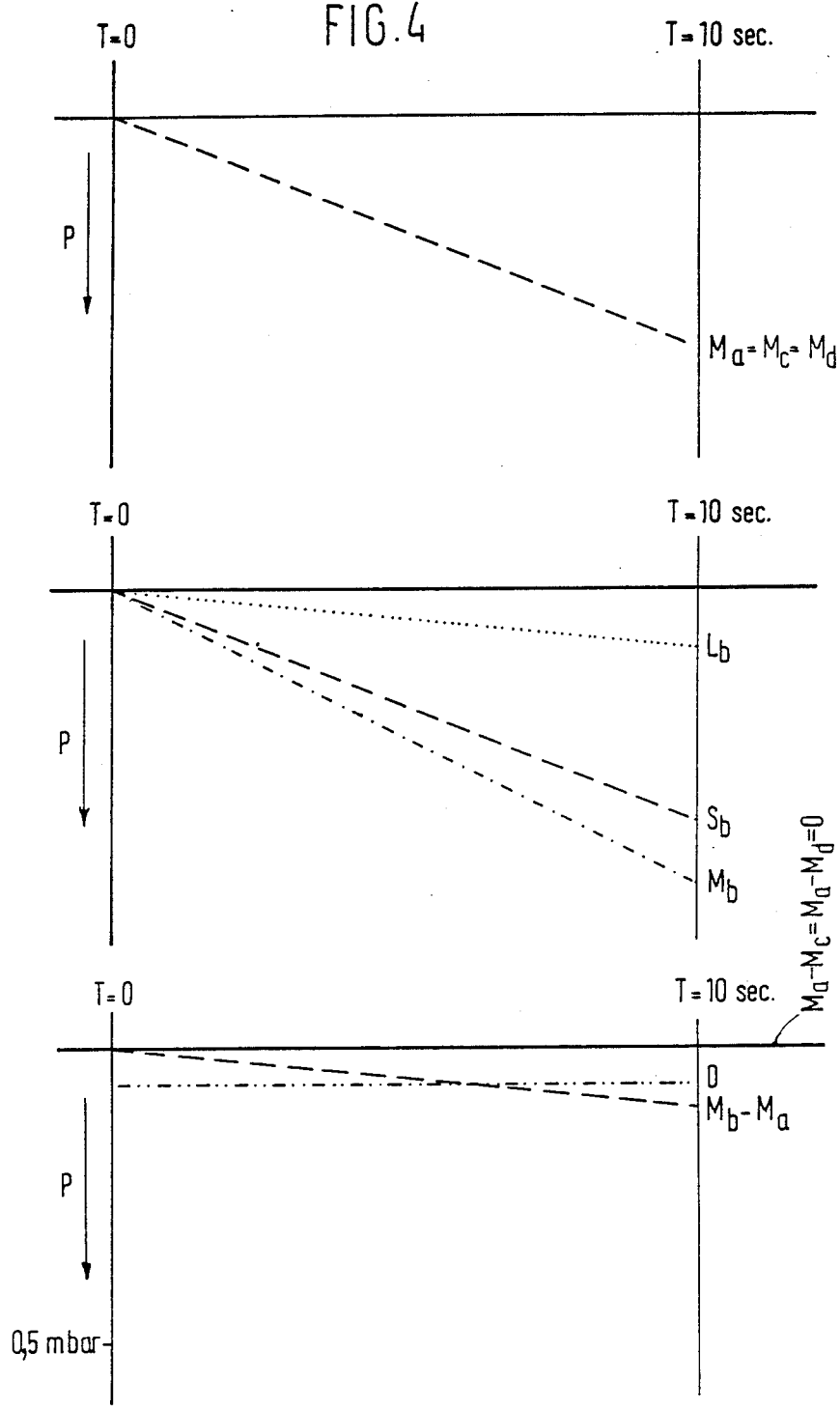
FIG. 4 shows three pressure/time diagrams to illustrate the simultaneous examination according to the present invention of four vacuum packages in four gauging chambers.

FIG. 4 shows pressure time diagrams during the simultaneous gauging according to the present invention of four packages in four separate gauging spaces A, B, C and D. The upper diagram shows the identical pressure variation of non-leaky packages in gauging spaces A, C and D, with the gauged signal being identical to the disturbance signal. The centre diagram shows the pressure variation in gauging space B. The lower diagram shows the difference in pressure variation between the two upper diagrams, from which is appears that the package in gauging space B is leaky.

Figure 3:
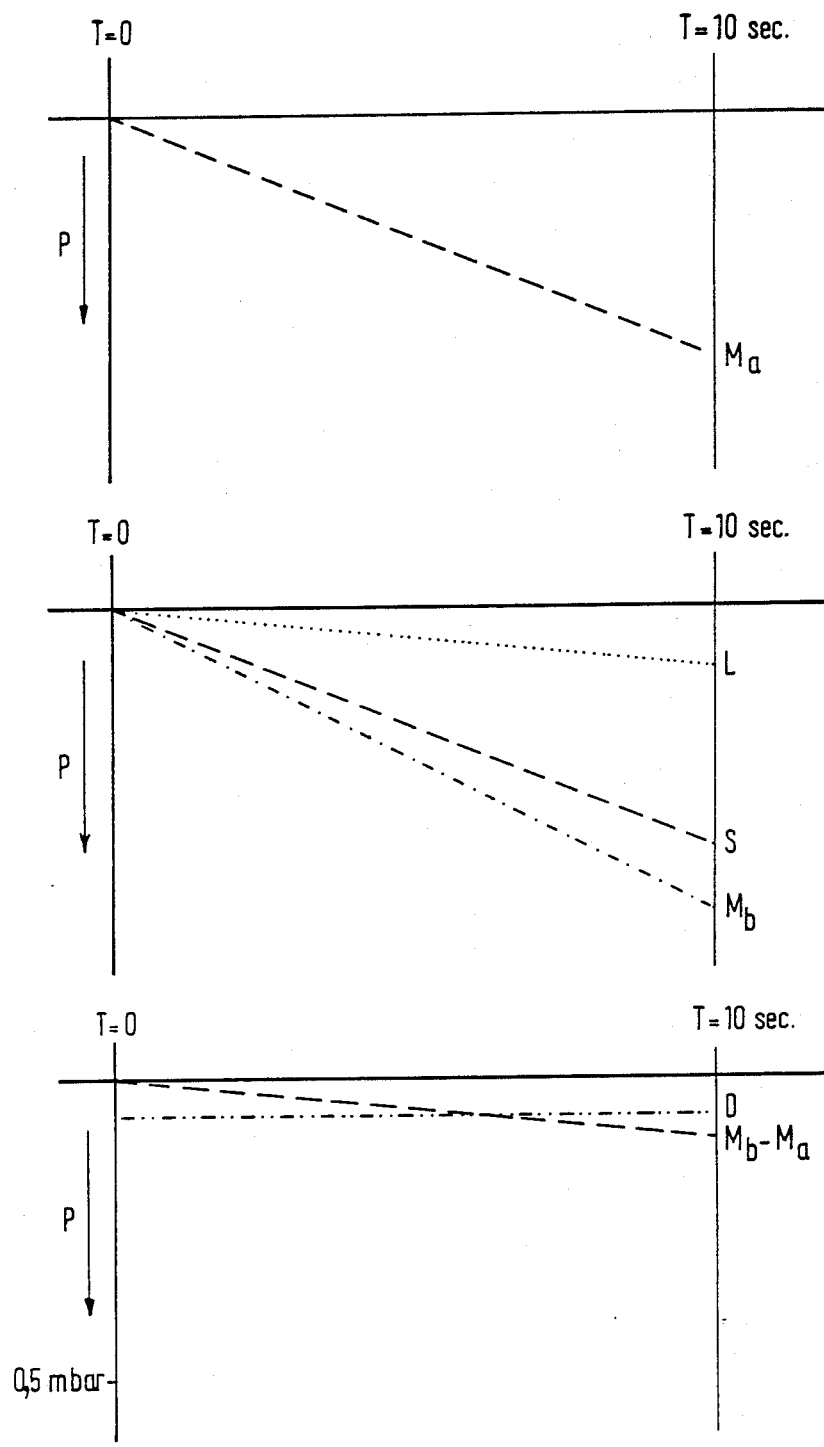
FIG. 3 shows three pressure/time diagrams to illustrate the simultaneous examination according to the present invention of two vacuum packages in two gauging chambers.

It is observed that the diagrams shown in FIGS. 2-4 only serve for representing the principle of the present invention. In practice, the entire processing of data is effected by a computer. The computer may be arranged to transmit a signal to remove a leaky package from a production stream.

Figure 5:
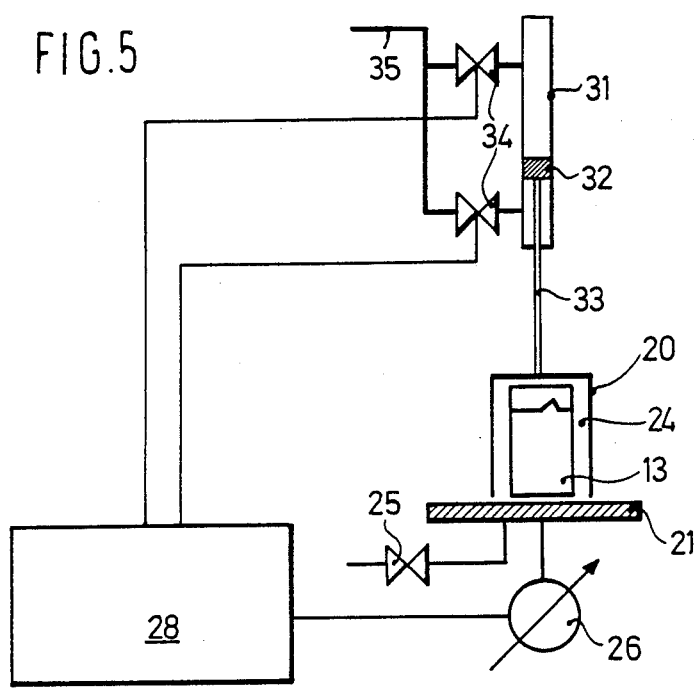
FIG. 5 shows another apparatus for determining a possible leak in a vacuum package.

FIG. 5 shows an apparatus according to the present invention, wherein the gauging chamber, unlike that in FIG. 1, is constructed as a bell jar 20, which can be placed with its open end downwards in an airtight condition on a gauging table 21. Bell jar 20 is coupled to a plunger rod 33 with plunger 32, which is adapted for up and down movement in a lift cylinder 31. Compressed air can be admitted underneath or above plunger 32 through a compressed-air line 35 and valves 34 for lifting bell jar 20 off the gauging table, so as to remove a tested package and place the next package or to lower the bell jar onto the table. For the same purpose as shown in FIG. 1, the apparatus further comprises a vent valve 25 and a pressure gauge 26. A gauging and control unit 28 serves for controlling the various parts of the apparatus and for processing the data of the pressure gauges.

In accordance with the present invention, at least two bell jars should be provided.

Figure 6:
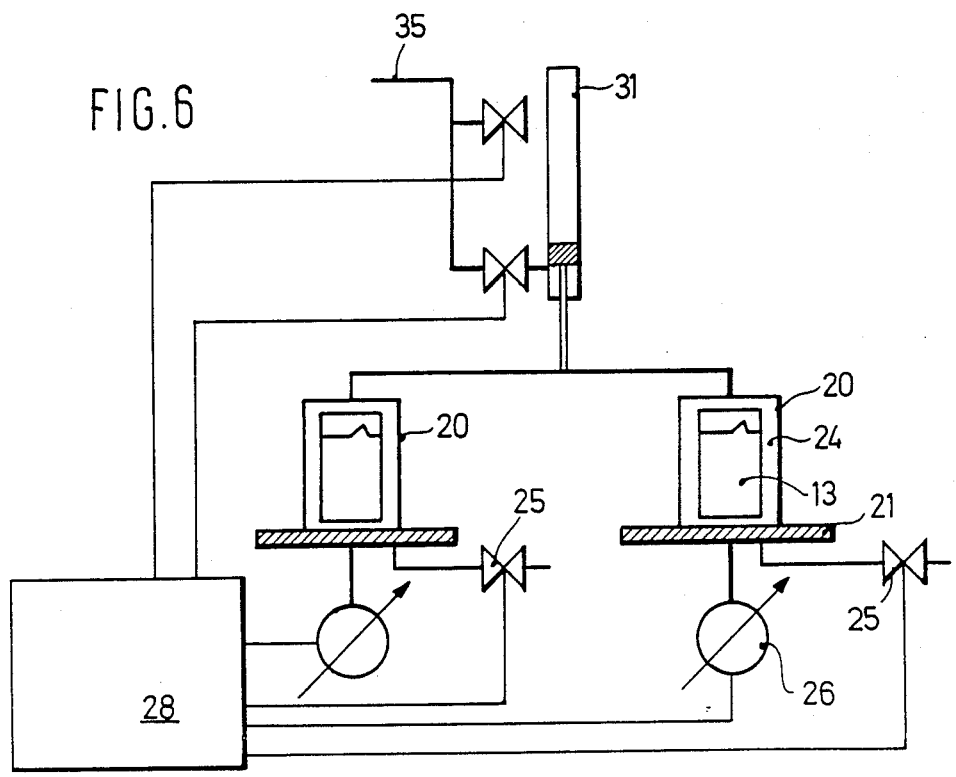
FIGS. 6 and 7 show apparatuses based on the apparatus according to FIG. 5 for determining leaks according to the invention in two and four gauging chambers, respectively.
Figure 7:
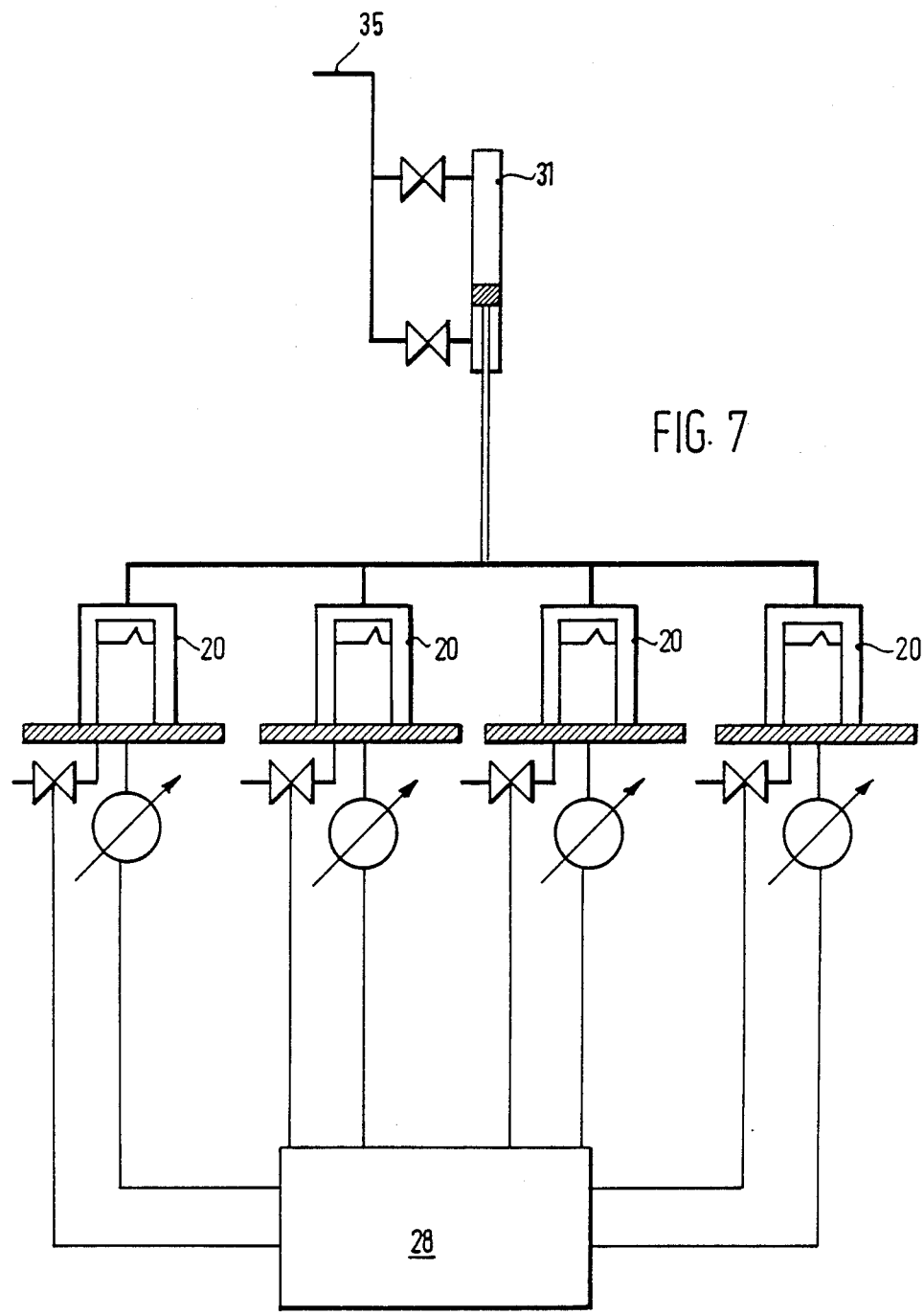

FIG. 6 shows the embodiment of FIG. 5 adjusted for simultaneous use of two bell jars and FIG. 7 shows the embodiment with four bell jars.

EXAMPLE I

Gauging chambers each having an internal volume of 740 cm$^3$ were used, in which vacuum packages with 500 g of ground coffee were tested. The initial pressure in the gauging space was atmospheric. The internal pressure in the packages was 40 mbar and the external volume 520 cm$^3$. The volume of the gauging space was 220 cm$^3$. It was found that, when a gauging time of 10 seconds was used, non-leaky packages showed pressure drops, resulting from thermal effects and the like, on the order of 0.35 mbar and with a leaky package a pressure drop due to leakage of 0.1 mbar was detected in 10 seconds, after correction for thermal effects. It was found that, when stored in atmospheric surroundings, it took as long as 48 hours for the vacuum pressure in the leaky package to have risen to 800 mbar, which allowed a human testor manuall to qualify the softened package as leaky by the feel.

EXAMPLE II

The same type of packages was now tested in gauging chambers according to FIG. 3 of European Pat. No. 152,981, wherein the package was placed in a thin, elastic wrapper which was pressed closely against the package, thereby obtaining a small gauging space between the wrapper and the package. Here, too, an atmospheric initial pressure was used in the gauging space. During the gauging of the packages for 10 seconds, a spurious signal occurred in the gauging space, possibly resulting from temperature influences and from "settling" of the wrapper, but this signal was smaller than in Example I. After correction for these disturbances, a pressure drop in the gauging space of 1.0 mbar was found to occur in the case of a leaky package. This package was subsequently found to soften in the atmosphere after 48 hours.

Owing to the substantially more favourable leakage-signal-to-noise ratio than in Example I, it was possible, on application of the gauging method according to Example II as a part of the present invention, to shorten the gauging time to 2 seconds, without impairing the reliability, with the corrected pressure drop being 0.2 mbar.

What I claim is:

1. A method for detecting whether any of at least two like, same-size vacuum packages of a product is leaky, comprising:
    (a) providing a plurality of openable-closable like-volume gauging chambers;
    (b) opening each of at least two of said chambers and placing a like, same-sized vacuum package of a product in each opened chamber;
    (c) closing each chamber which contains a respective said package, thereby defining in each closed chamber a gauging space between walls of the respective chamber and the respective package;
    (d) simultaneously providing each gauging space with a like fluid pressure that is higher than a substantially like below-atmospheric pressure level which each package contains if non-leaky;
    (e) upon passage of a selected time from when each gauging space was provided with said like pressure, gauging fluid pressure in each said gauging space; and
    (f) comparing fluid pressures sensed in step (e), in sets of two, looking for instances of variation in sensed fluid pressure between the two members in a set which exceed a selected magnitude.

2. The method of claim 1, wherein:
    in step (a), at least three said chambers are provided, and, in step (b), a respective said package is placed in a respective one of each of at least three said chambers.

3. The method of claim 1, wherein:
    in step (a), at least four said chambers are provided, and, in step (b), a respective said package is placed in a respective one of each of at least four said chambers.

4. The method of claim 1, wherein:

step (d) is accomplished by simultaneously temporarily communicating all of said gauging spaces with a common pressure source.

5. The method of claim 4, wherein:
said common pressure source is earth's atmosphere.

6. Apparatus for detecting whether any of at least two like, same-size vacuum packages of a product is leaky, comprising:
wall means providing a plurality of openable-closable like-volume gauging chambers, all capable of simultaneously each receiving a respective like, same-sized vacuum package of a product which, if non-leaky, has a substantially like, below-atmospheric pressure so as to provide in each chamber, externally of the respective said package contained therein, a respective gauging space;

means for simultaneously temporarily communicating to each said gauging space, when the chamber contains a respective said package and is closed, a like fluid pressure which is higher than said substantially below-atmospheric pressure;

means for gauging the fluid pressure in each said gauging space after a like period of time has passed from when the gauging spaces were temporarily communicated to said like fluid pressure to obtain respective fluid pressure values; and means for comparing said fluid pressure valves in sets of two, looking for instances of variation in sensed fluid pressure between the two members in a set which exceed a selected magnitude.

7. The apparatus of claim 6, wherein:
said wall means provide each said chamber with a substantially constant volume.

8. The apparatus of claim 6, wherein:
said wall means are flexible.

* * * * *